United States Patent
Parkvall et al.

(10) Patent No.: US 7,197,317 B2
(45) Date of Patent: Mar. 27, 2007

(54) METHOD AND SYSTEM OF RETRANSMISSION

(75) Inventors: Stefan Parkvall, Stockholm (SE); Johan Torsner, Masala (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 503 days.

(21) Appl. No.: 10/477,414

(22) PCT Filed: May 21, 2002

(86) PCT No.: PCT/SE02/00986

§ 371 (c)(1),
(2), (4) Date: Nov. 13, 2003

(87) PCT Pub. No.: WO02/096044

PCT Pub. Date: Nov. 28, 2002

(65) Prior Publication Data

US 2004/0147236 A1   Jul. 29, 2004

(30) Foreign Application Priority Data

May 22, 2001   (SE) .................... 0101846

(51) Int. Cl.
*H04Q 7/20* (2006.01)
*H04B 17/00* (2006.01)

(52) U.S. Cl. .............. 455/452.1; 455/452.2; 455/67.11

(58) Field of Classification Search .......... 455/67.11, 455/452.1, 452.2, 412.1, 445, 450, 426.1, 455/412.2; 370/349, 329, 392, 412, 474
See application file for complete search history.

(56) References Cited

U.S. PATENT DOCUMENTS

| | | | |
|---|---|---|---|
| 6,160,839 A | 12/2000 | Zhang | |
| 6,272,119 B1 | 8/2001 | Kage | |
| 6,327,255 B1 | 12/2001 | Kage | |
| 6,717,927 B2 * | 4/2004 | Chao et al. | 370/331 |
| 6,947,737 B2 * | 9/2005 | Massie et al. | 455/426.1 |
| 7,000,174 B2 * | 2/2006 | Mantha et al. | 714/790 |
| 7,012,913 B2 * | 3/2006 | Maturi | 370/349 |
| 2004/0120284 A1 * | 6/2004 | Terry et al. | 370/329 |
| 2004/0146033 A1 * | 7/2004 | Soderstrom et al. | 370/338 |
| 2005/0039101 A1 * | 2/2005 | Torsner | 714/748 |
| 2005/0276249 A1 * | 12/2005 | Damnjanovic et al. | 370/335 |

FOREIGN PATENT DOCUMENTS

| | | |
|---|---|---|
| WO | 99/55110 A2 | 10/1999 |
| WO | 00/13447 A1 | 3/2000 |

* cited by examiner

Primary Examiner—Sonny Trinh
(74) Attorney, Agent, or Firm—Nixon & Vanderhye P.C.

(57) ABSTRACT

The present invention relates to generation and transmission of status reports utilizing available HARQ information. The invention is well suited for a cellular mobile radio communications system, particularly a Universal Mobile Telecommunications System, UMTS.

33 Claims, 6 Drawing Sheets

METHOD AND SYSTEM OF RETRANSMISSION

This application is the US national phase of international application PCT/SE02/00986, filed 21 May 2002, which designated the US. PCT/SE02/00986 claims priority to SE Application No. 0101846-4, filed 22 May 2001. The entire contents of these applications are incorporated herein by reference.

TECHNICAL FIELD OF THE INVENTION

The present invention relates to retransmissions in a communications system, and more especially it relates to a cellular mobile radio system, particularly to a Universal Mobile Telecommunications System, UMTS or WCDMA system.

BACKGROUND AND DESCRIPTION OF RELATED ART

Retransmission of data to or from a mobile station, MS, or user equipment, UE, is previously known. It is also known to use medium access control and radio link control layers of a UMTS protocol structure in acknowledged mode for dedicated channels.

In acknowledged mode, retransmissions are undertaken in case of detected transmission errors not recovered by forward error control. This is also called automatic repeat request, ARQ. With ARQ, retransmissions can be undertaken unless a transmitted message is (positively) acknowledged or if it is negatively acknowledged. Generally there are time limits for the respective positive and negative acknowledgements to be considered.

Within this patent application, a radio network controller, RNC, is understood as a network element including a radio resource controller. Node B is a logical node responsible for radio transmission/reception in one or more cells to/from a User Equipment. A base station, BS, is a physical entity representing Node B.

Medium access control, MAC, and radio link control, RLC, is used within radio communications systems like General Packet Radio Services, GPRS, and UMTS.

U.S. Pat. No. 5,570,367 discloses a wireless communications system arranged to transmit acknowledgement and request for retransmission messages. Data received in a microcell from an end user device is forwarded to a cell site. Data received by the cell site is transmitted to a cellular switch. A base station sends a poll message to the end user device, inquiring for the status of unacknowledged messages previously transmitted from the base station.

Also, a base station transmitter window is defined. A lower end pointer identifies a lowest numbered packet transmitted to and acknowledged by the base station. The upper end pointer identifies the highest numbered packet transmitted by the base station. Consequently, the window represents packets transmitted by the base station and unacknowledged by the end user device.

U.S. Pat. No. 5,222,061 describes a data services retransmission procedure to control unnecessary multiple retransmissions of a data packet by tracking the sequence numbers of transmitted packets. The data packet is retransmitted if it appears in the list prior to the last data packet that is received correctly. Upon retransmission, the sequence numbers of the list are rearranged. A receiver transmits a status control message to a transmitter periodically. The patent recognizes that the receiver may have correctly received a packet, which was included in a status control message.

U.S. Pat. No. 6,118,765 also recognizes an acknowledge scheme of a discriminator using a sliding window. The discriminator passes valid packets for forwarding.

$3^{rd}$ Generation Partnership Project (3GPP): *Technical Specification Group Radio Access Network, Physical Layer Procedures*, 3G TS 25.301 v3.6.0, France, September 2000, specifies in chapter 5 Radio Interface Protocol Architecture of a UMTS system. There are three protocol layers:

physical layer, layer 1 or L1,
data link layer, layer 2 or L2, and
network layer, layer 3 or L3.

Layer 2, L2, and layer 3, L3 are divided into Control and User Planes. Layer 2 consists of two sub-layers, RLC and MAC, for the Control Plane and four sub-layers, BMC, PDCP, RLC and MAC, for the User Plane. The acronyms BMC, PDCP, RLC and MAC denote Broadcast/Multicast Control, Packet Data Convergence Protocol, Radio Link Control and Medium Access Control respectively.

FIG. 1 illustrates a simplified UMTS layers 1 and 2 protocol structure for a Uu Stratum, UuS, or Radio Stratum, between a user equipment UE and a Universal Terrestrial Radio Access Network, UTRAN.

Radio Access Bearers, RABs, make available radio resources (and services) to user applications. For each mobile station there may be one or several RABs. Data flows (in the form of segments) from the RABs are passed to respective Radio Link Control, RLC, entities which amongst other tasks buffer the received data segments. There is one RLC entity for each RAB. In the RLC layer, RABs are mapped onto respective logical channels. A Medium Access Control, MAC, entity receives data transmitted in the logical channels and further maps logical channels onto a set of transport channels. In accordance with subsection 5.3.1.2 of the 3GPP technical specification MAC should support service multiplexing e.g. for RLC services to be mapped on the same transport channel. In this case identification of multiplexing is contained in the MAC protocol control information.

Transport channels are finally mapped to a single physical channel which has a total bandwidth allocated to it by the network. In frequency division duplex mode, a physical channel is defined by code, frequency and, in the uplink, relative phase (I/Q). In time division duplex mode a physical channel is defined by code, frequency, and time-slot. The DSCH, e.g., is mapped onto one or several physical channels such that a specified part of the downlink resources is employed. As further described in subsection 5.2.2 of the 3GPP technical specification the L1 layer is responsible for error detection on transport channels and indication to higher layer, FEC encoding/decoding and interleaving/deinterleaving of transport channels.

PDCP provides mapping between Network PDUs (Protocol Data Units) of a network protocol, e.g. the Internet protocol, to an RLC entity. PDCP compresses and decompresses redundant Network PDU control information (header compression and decompression).

For transmissions on point-to-multipoint logical channels, BMC stores at UTRAN-side Broadcast Messages received from an RNC, calculates the required transmission rate and requests for the appropriate channel resources. It receives scheduling information from the RNC, and generates schedule messages. For transmission the messages are mapped on a point-to-multipoint logical channel. At the UE side, BMC evaluates the schedule messages and deliver Broadcast Messages to upper layer in the UE.

3G TS 25.301 also describes protocol termination, i.e. in which node of the UTRAN the radio interface protocols are terminated, or equivalently, where within UTRAN the respective protocol services are accessible.

$3^{rd}$ Generation Partnership Project (3GPP): *Technical Specification Group Radio Access Network, Physical Layer Procedures*, *3G TS 25.322 v3.5.0*, France, December 2000, specifies the RLC protocol. The RLC layer provides three services to the higher layers:

transparent data transfer service, unacknowledged data transfer service, and acknowledged data transfer service.

In subsection 4.2.1.3 an acknowledged mode entity, AM-entity, is described (see FIG. 4.4 of the 3GPP Technical Specification). In acknowledged mode automatic repeat request, ARQ, is used. The RLC sub-layer provides ARQ functionality closely coupled with the radio transmission technique used. The 3GPP technical specification also reveals various triggers for a status report to be transmitted. The receiver shall always send a status report, if it receives a polling request. There are also three status report triggers, which can be configured 1. Missing PU(s) Detected,
2. Timer Initiated Status Report, and
3. Estimated PDU Counter.

For trigger 1, the receiver shall trigger transmission of a status report to the sender if a payload unit, PU, is detected to be missing. (One PU is included in one RLC PDU.) With trigger 2, a receiver triggers transmission of a status report periodically according to a timer. Finally, trigger 3 relates in short to a timer corresponding to an estimated number of received PUs before the requested PUs are received. The 3GPP Technical Specification specifies a status PDU used to report the status between two RLC AM ('Acknowledged Mode') entities.

None of the cited documents above discloses a method and system of eliminating or reducing transmissions of link status reports over a scarce link resource.

SUMMARY OF THE INVENTION

Cited prior art references describe retransmissions between a UE and an RNC. According to preferred embodiments of the invention retransmissions are terminated in Node B and UE respectively.

Status reports are transferred between RLC entities in order to, e.g., update the transmitter window. Even if retransmissions are terminated in Node B, there are reasons for keeping RLC functionality in RNC. Accordingly, RNC will poll a UE connected to the RNC for status reports. This polling and subsequent transmission of the requested status report will increase the load on the radio interface.

Consequently, it is an object of this invention to eliminate or reduce transmissions over a scarce resource such as a radio interface.

A further object is to also generate status reports in Node B.

It is also an object to achieve a system compatible with status reports being generated for some triggers in a user equipment and for some triggers in a Node B.

Finally, it is an object to introduce an L2 protocol in Node B, responsible for communication of status reports.

These objects are met by the invention, which is particularly well suited for a high-speed downlink packet access channel of an evolved universal mobile telecommunications system.

Preferred embodiments of the invention, by way of examples, are described with reference to the accompanying drawings below.

DESCRIPTION OF PREFERRED EMBODIMENTS

Figure 1:
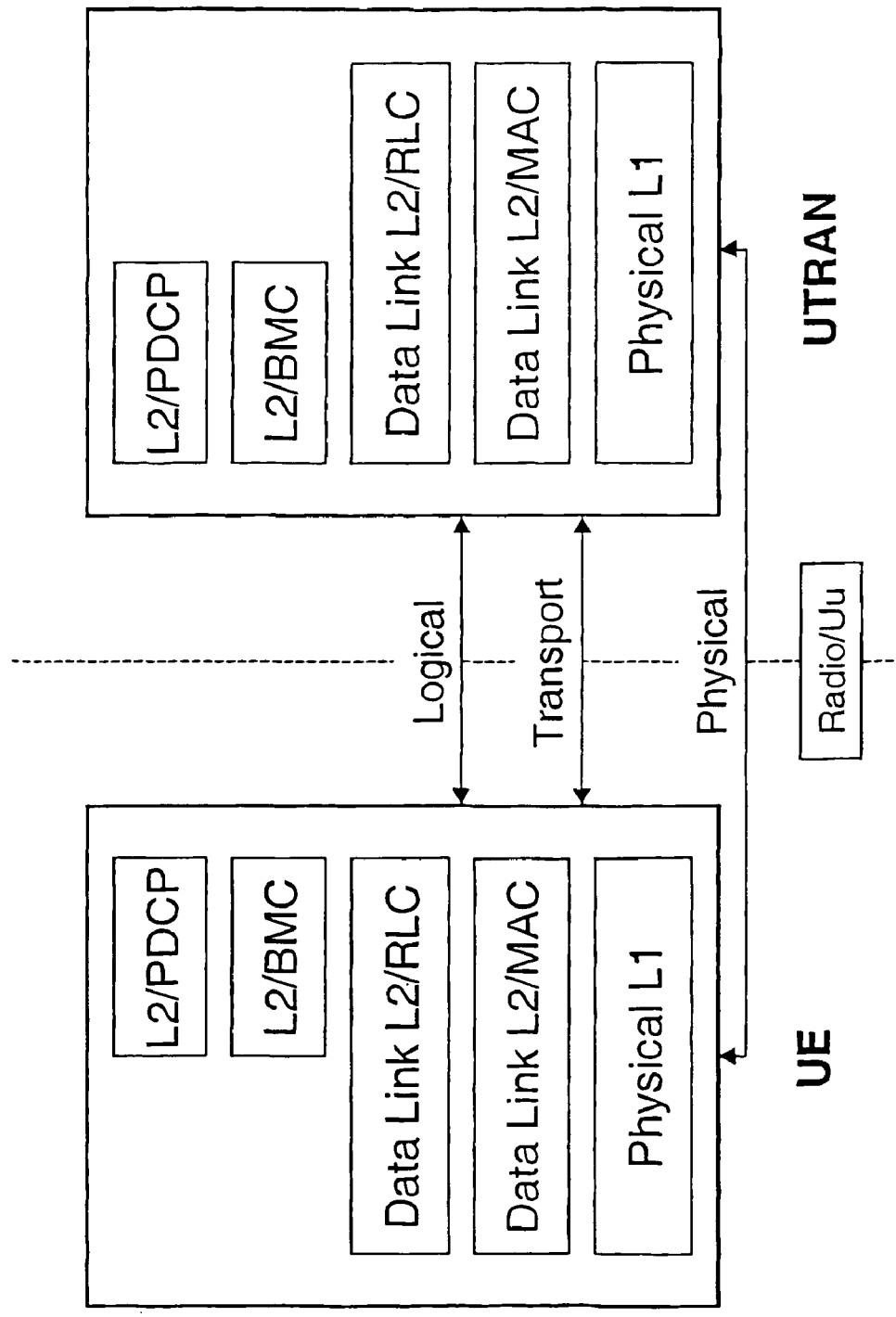
FIG. 1 displays a layered protocol structure, according to prior art, in a radio communications system.
Figure 2:
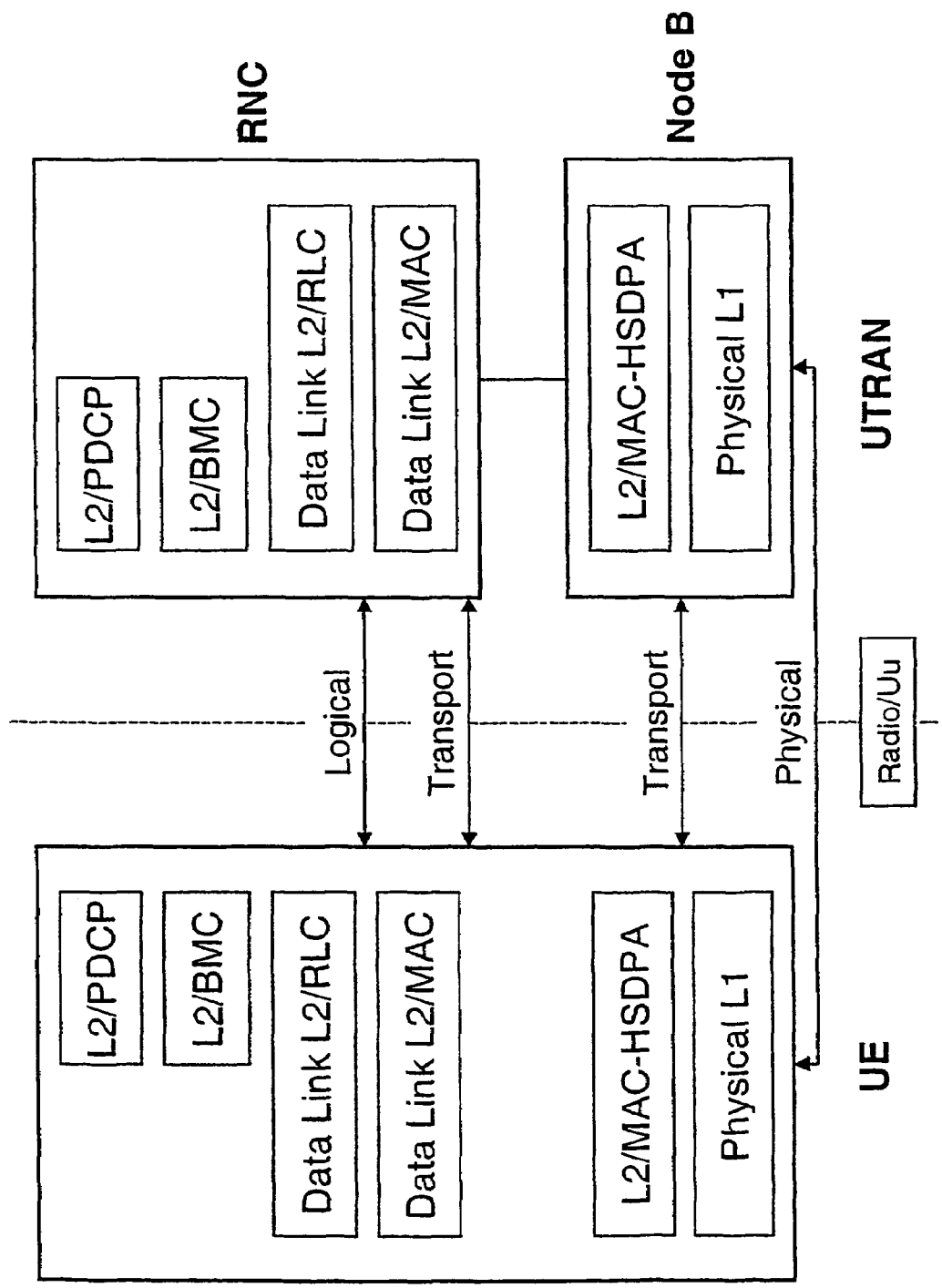
FIG. 2 displays a layered protocol structure, according to the invention, in a radio communication system.

FIG. 2 show a preferred layered protocol structure, a protocol stack, according to the invention The L2 MAC layer of FIG. 1 has been extended and divided into two sub-layers, a new L2 MAC sub-layer and a new MAC-HSDPA sub-layer. Essentially the new L2 MAC sub-layer corresponds to the prior art L2 MAC sub-layer of FIG. 1. The MAC-HSDPA plus the MAC layer could be regarded as one single MAC layer extended to also include hybrid ARQ functionality. However, for reasons of explanation they are preferably regarded as separate sub-layers. Further, on the network side, considering them as separate protocol sub-layers physically better corresponds to the physical entities where they reside. As illustrated in FIG. 2 on the UTRAN-side (or network side) L2 MAC sub-layer is preferably located in RNC, whereas L2 MAC-HSDPA sub-layer is located in Node B. As the hybrid ARQ protocol combines successively received retransmissions it is a great advantage to have this protocol close to the physical layer and, particularly, in Node B. Among the advantages achieved thereby, e.g., the roundtrip delay is reduced as compared to a location in RNC. Within this patent application the protocol layers, except for L2 MAC and L2 MAC-HSDPA as just explained, correspond to those of FIG. 1.

Figure 3:
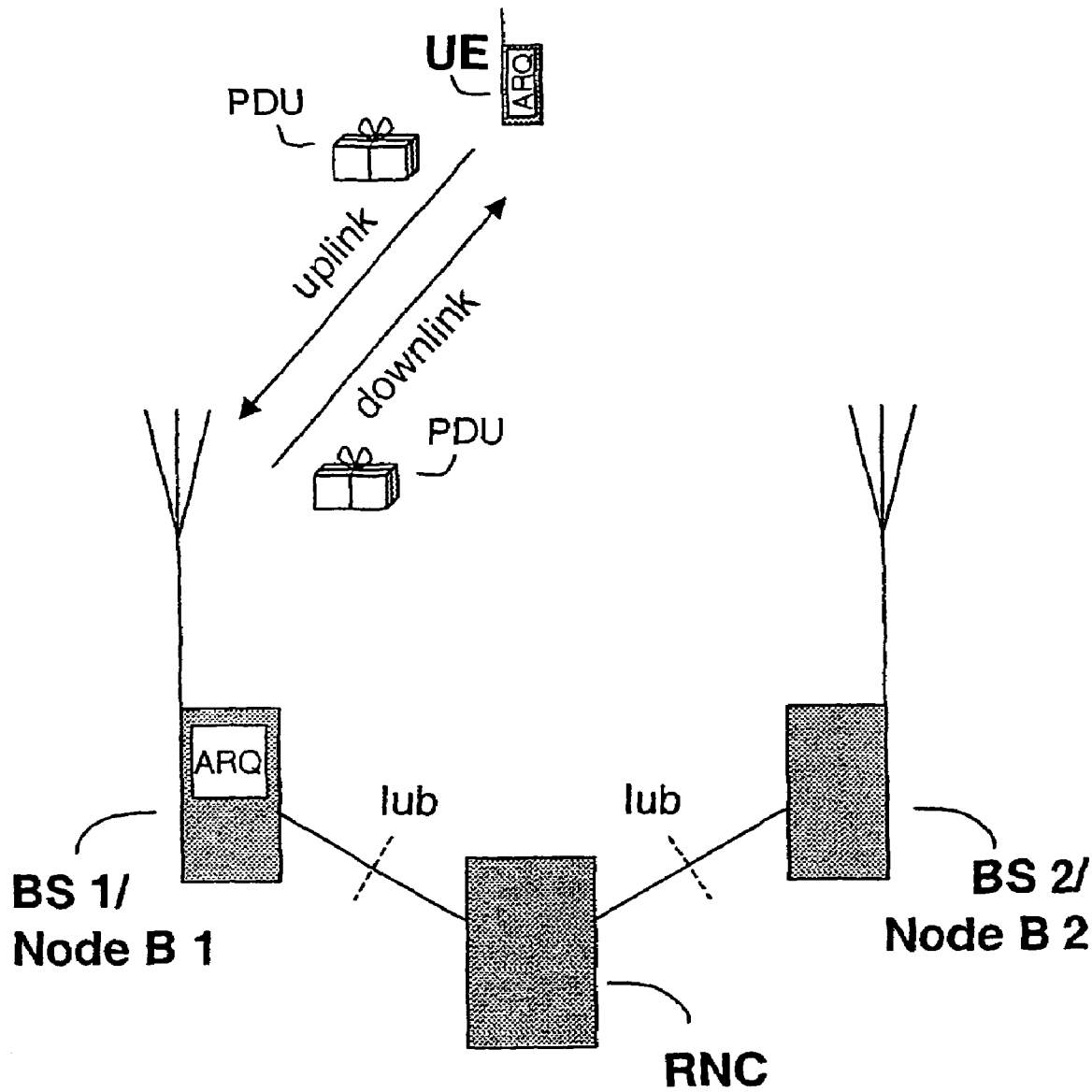
FIG. 3 shows communication, according to the invention, between a UE and a base station involved in a connection between an RNC and the UE.

With reference to FIG. 3, Node B 1 and Node B 2 of a radio communications system are logical nodes responsible for radio transmission/reception in one or more cells to/from the User Equipment UE. BS 1 and BS 2 are physical entities representing Node B 1 and Node B 2 respectively. Node B 1 and Node B 2 terminate the air interface, called Uu interface within UMTS, between UE and respective Node B towards the radio network controller RNC. In UMTS the interface between a Node B and an RNC is called Iub interface.

Preferably, all Nodes B of the radio communications system operate according to the invention for outstanding performance. However, the invention can also be used in systems also including Nodes B not operating according to the invention.

Figure 4:
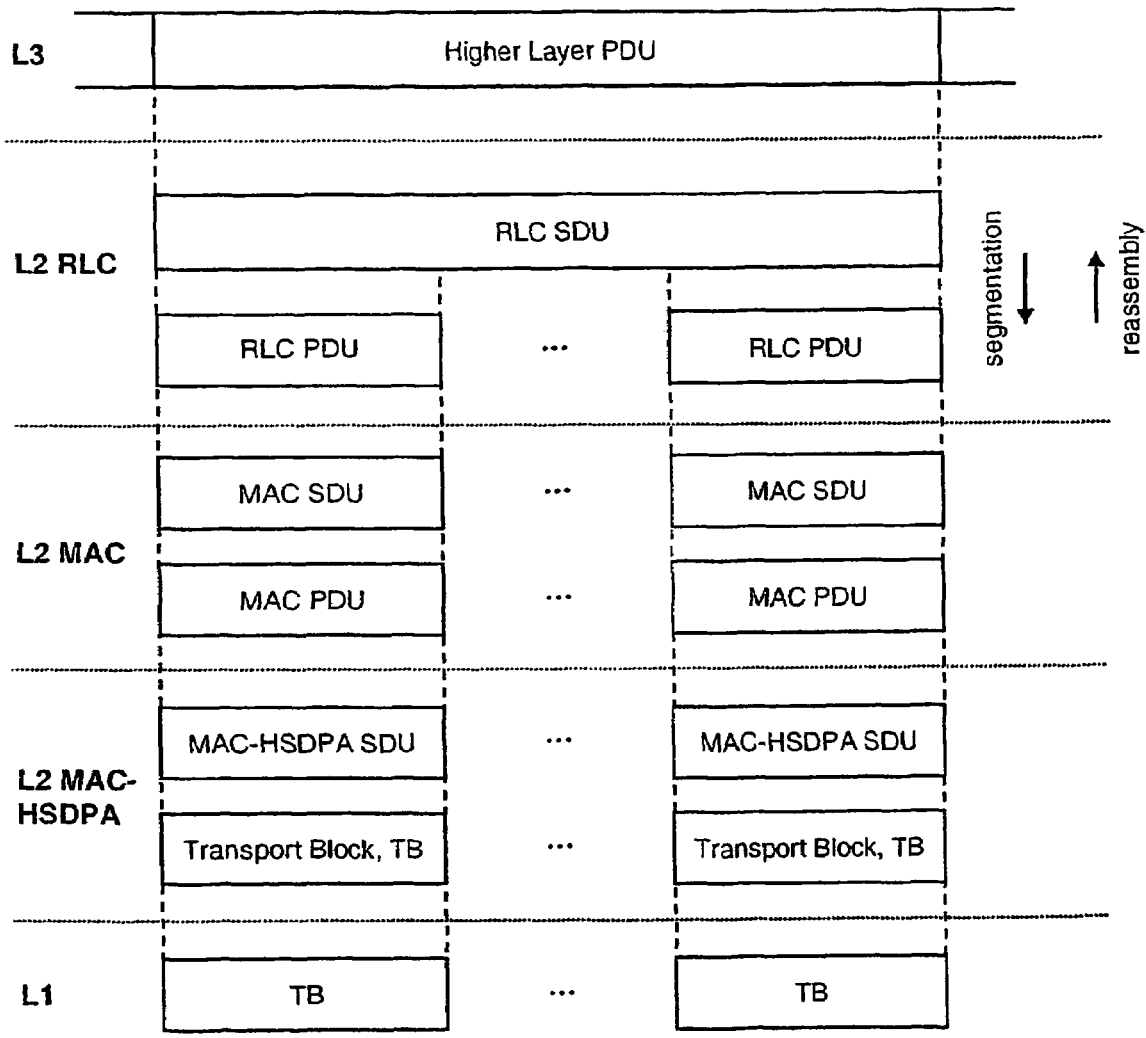
FIG. 4 schematically illustrates MAC and RLC protocol layers, according to the invention, in a multilayer protocol structure.

FIG. 4 describes somewhat more detailed than FIG. 2 the information transfer between the sub-layers of the protocol stack. In an exemplary situation, and with reference to FIG. 3, UE communicates over a radio link associated with BS 1.

Packet switched data is transmitted in protocol data units, PDUs, in both directions. Each PDU is transported on a transport channel in at least one transport block, TB, as shown in FIG. 4. Preferably there is one TB for each PDU. As described above, transmission errors on the transport channel are corrected and detected by layer L1. Each transport block, TB, in FIG. 4 can be provided an individual CRC error-detecting checksum prior to transmission on the physical channel. However, preferably a transmission unit, carrying one or more TBs, is provided only one CRC error-detecting checksum. If a transmission unit is detected to be in error on the receiving side, this is reported to the L2 MAC layer.

L2 MAC layer can request retransmission of transmission units received in error. Transmission units, detected to be in error, still carry information that should not be wasted. Preferably hybrid ARQ, utilizing information available from earlier transmission(s) of a transmission unit by proper combining with the latest retransmission, is used prior to an L2 MAC layer request for retransmission.

At the receiving end, error detection is also performed by layer L2 RLC of FIG. 4. If an RLC protocol data unit, PDU, is received in error or the PDU is missing, it will be requested for retransmission at a point in time when a status report is established by the RLC layer. RLC PDUs are transferred to/from the MAC layer SDUs. The MAC SDU possibly includes a header not included in the RLC PDU. As explained in relation to FIG. 2, according to the invention there are preferably two MAC sub-layers, an L2 MAC sub-layer and an L2 MAC-HSDPA sub-layer. In a preferred embodiment of the invention, the L2 MAC sub-layer is located in RNC and the L2 MAC-HSDPA sub-layer is located in Node B. As previously described, the RLC PDUs are transferred in transport blocks, TBs, on the physical channel. The L2 MAC-HSDPA layer transfers TBs to the L1 physical layer. In the reverse direction the L2 MAC-HSDPA layer transfers TBs, possibly after combining of multiple transmissions of the respective TBs, indicated to be error-free to the L2 MAC layer. TBs not indicated to be error-free are requested for retransmission.

A network layer PDU or L3 PDU can comprise several RLC PDUs, as illustrated in FIG. 4. RLC PDUs are reassembled into RLC service data units, RLC SDU, prior to delivery to higher layer PDU. The L3 protocol can be, e.g., the Internet Protocol, IP. Upon reception from L3, RLC SDUs are segmented into RLC PDUs.

In an evolved WCDMA system, a high-speed downlink packet access channel, HSDPA channel, is a channel with similarities to a DSCH. However, it is based on a novel transport channel type. In the sequel, this is referred to as a High-Speed Downlink Shared CHannel, HS-DSCH. An HS-DSCH supports many new features not supported by DSCH, but also inherits some of the characteristics of a DSCH. There are several important features of an HS-DSCH. A sample of features is:

- High data rates with peak data rates up to tens of Mbit/s.
- Data is transmitted to multiple users on a shared channel by means of time-division multiplex, TDM, or code-division multiplex, CDM.
- Higher-order modulation.
- Modulation adaptive to radio channel conditions.
- Fast retransmission with soft combining of retransmitted data at UE, also referred to as Fast Hybrid ARQ or Fast HARQ.
- Low air-interface delay, with maximum roundtrip delay down to some ten milliseconds.

It is preferred that the Fast Hybrid ARQ is terminated in Node B. Given L2 RLC located in RNC, the RLC layer should not be responsible of Fast Hybrid ARQ. According to preferred embodiments of the invention, an L2 MAC-HSDPA sub-layer is responsible of Fast Hybrid ARQ. At UTRAN-side the L2 MAC-HSDPA sub-layer is located in Node B.

As an alternative to introducing the MAC-HSDPA sub-layer in Node B, the RLC protocol could reside in Node B. However, for reasons of compatibility RLC is in charge of ciphering and in-order delivery, preferably located in RNC. With RLC sub-layer residing in RNC, reliable packet delivery will be insured between Node B and RNC.

One reason for terminating the Fast Hybrid ARQ in Node B is the reduction of roundtrip delay as compared to terminating it in RNC. Another reason is that Node B is capable of using soft combining of multiply transmitted data packets, whereas RNC generally only receives hard-quantized bits.

L2 RLC sub-layer requires status reports acknowledging packet data units previously transferred from the L2 RLC layer, e.g. to advance the sliding transmitter window of the L2 RLC protocol. When, e.g., a poll timer times out it consequently transfers an inquiry for a status report. This inquiry is destined for the UE, in accordance with prior art. However, such an inquiry would load the scarce resource of the radio interface between Node B and UE. Further, terminating the Fast Hybrid ARQ in Node B, during stable operating conditions this node will be currently informed of the receive status of the UE in accordance with the Fast Hybrid ARQ scheme, possibly with a short delay for the most recent update of UE.

According to a preferred embodiment of the invention the Hybrid ARQ protocol entity at UTRAN-side generates status reports to the RNC-RLC. Status reports can be generated either upon request of the RNC-RLC (polling) or as conditionally triggered locally. In case of the latter, the triggers described in prior art and referred to on page 5 apply. Another trigger to be included is the number of PDUs received by Node B from RNC. When a predefined number of PDUs have been received by Node B, a status report is established in the Hybrid ARQ protocol entity, and transmitted to RNC.

Correspondingly, when Node B deals with status report establishment, the status report triggering in the UE can be relieved, in order not to load the scarce communication link resource between Node B and UE. With reference to trigger 1 on page 5, the triggering of UE can be avoided if Node B detects the missing PU in due time for delivery to UE prior to a point in time when it would otherwise have been detected or otherwise initiated establishment and transmission of a status report from UE. Triggers 2 and 3 depend on a preset time interval or number of PDUs. By extending the parameters appropriately, the number of status reports per unit time initiated in UE by these triggers can be reduced to a sufficiently small number, not loading the scarce communication link resource between UE and Node B more than necessary.

Figure 5A:
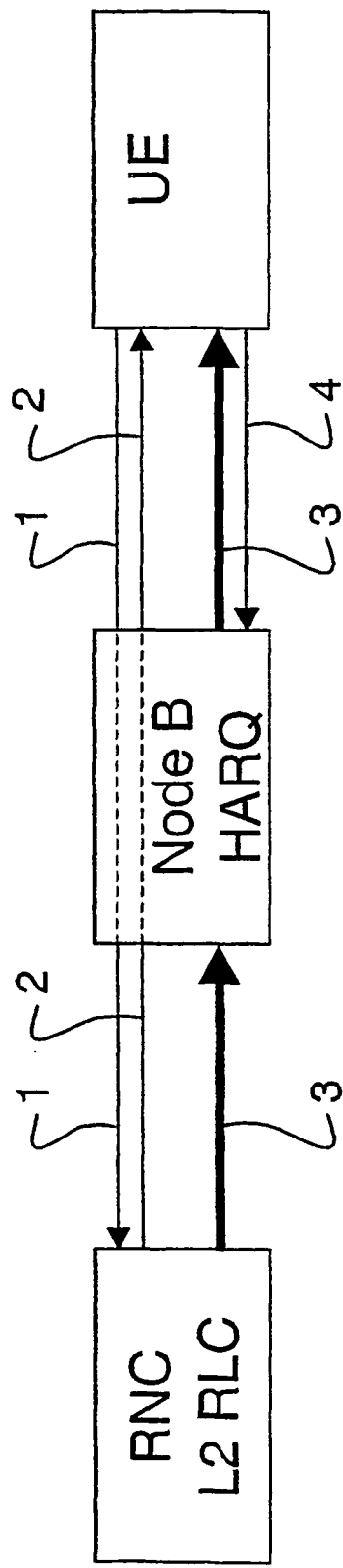
FIG. 5 schematically illustrates the status report generation and transmissions, according to the invention.
Figure 5B:
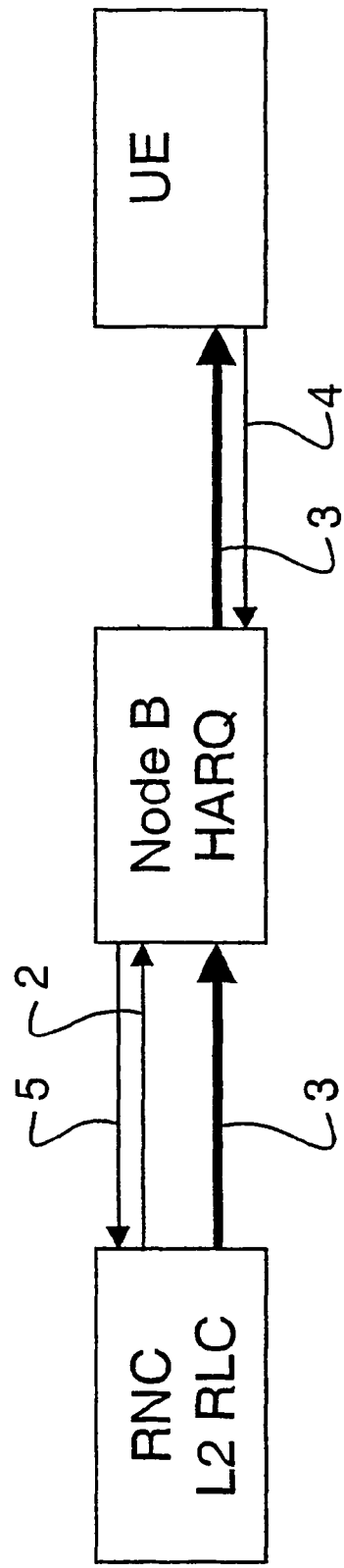

FIGS. 5a and 5b schematically illustrate the status report generation and transmissions, according to the invention. In FIG. 5a, L2 RLC located in RNC transfers data to UE via Node B, as already described in relation to FIGS. 1–4. Downlink data 3 and requests for status reports 2 are transferred 3, 2 to UE via Node B. UE can also generate status reports when properly triggered locally. Status reports 1 are transmitted from UE to RNC, as described in relation to cited prior art.

In FIG. 5a, the Hybrid ARQ protocol resides in Node B. Downlink data is transmitted 3 over the radio interface between Node B and UE. Depending on whether the data transmission was successful or not, acknowledgements are transmitted 4 to Node B from UE. Status reports are generated in UE if data packets are missing, or detected to be out of sequence and transmitted 1, 4 to Node B. Status reports can also be transmitted 4 from UE upon request from Node B. In the sequel acknowledgements and status reports, and possibly other signaling related to Fast Hybrid ARQ, from UE to Node B are collectively referred to as HARQ signaling 4. Consequently, Node B has a good picture of the UE status as regards data packets transmitted to UE from RNC via Node B.

FIG. 5b shows a preferred solution according to the invention, where UE status in accordance with transmitted downlink data 3 and HARQ signaling 4 is stored in the HARQ protocol entity, preferably a MAC-HSDPA protocol.

When UE might locally generate status reports according to one or more predefined triggers, the one or more status reports are transferred 4 to Node B. Upon reception in Node B, this Node decides whether or not a received status report concerns also L2 RLC protocol layer. If so, the status report, possibly edited by Node B, is transferred 5 to L2 RLC residing in RNC. If not, Node B will undertake all actions necessary, in accordance with the status report.

An example of a UE-generated status report concerning the L2 RLC protocol of RNC is when UE-HARQ protocol, preferably in the MAC-HSDPA protocol link layer, detects a failure in UE, possibly due to a previously transmitted acknowledgment received in error by Node B. Upon detection of this failure, an RLC PDU will not be transferred from L2 MAC sub-layer to L2 RLC sub-layer of UE, as only presumably correct PDUs are transferred. When L2 RLC sub-layer of UE detects a missing RLC PDU, the sequence number of the missing RLC PDU will be included in a status report, generated by UE, and requested for retransmission from L2 RLC residing in RNC. Swedish patent application No. 0100739-2 assigned to the Applicant, and incorporated herein by reference, describes a method and system of retransmission, reducing or eliminating unnecessary retransmissions. This method and system can also be applied with the present invention, further reducing the load on the radio interface.

When L2 RLC, residing in RNC, sends a request for status report to UE, the request is first received in Node B, in both FIGS. 5a and 5b. In FIG. 5a, the request for status report is forwarded 2 to UE by default. Consequently, the requests and their responses load the radio interface between Node B and UE. Between Node B and UE, signaling and packet transfer are indicated by double arrows, 1 and 4 for uplink, and 2 and 3 for downlink, due to their logical differences. However, there is only one physical radio spectrum available with a limited channel capacity in each direction. Therefore, when the HARQ protocol entity or Node B is made responsible for status report generation and replies to L2 RLC requests for status reports, as in FIG. 5b, the load on the radio interface can be relieved. Hence, the elimination of arrows 1 and 2 between Node B and UE in FIG. 5b is not absolute. Depending on triggers selected, potential protocol failure etc. some signaling or packet transfer illustrated by the arrows in FIG. 5a may remain. However, the lack of these arrows in FIG. 5b illustrates that a substantial amount of the load can be eliminated according to the invention. In the foregoing, it was explained for various status report triggers, not limiting the invention only to this or other particular examples, how the invention can reduce the load of a scarce communication link resource in downlink, in uplink, or both.

Figure 6:
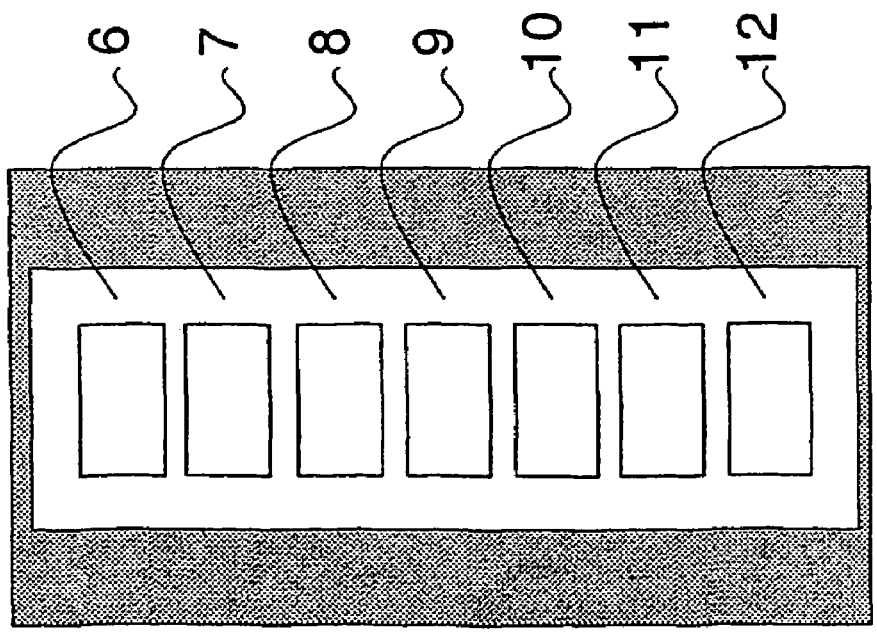
FIG. 6 displays a Node B according to the invention.

FIG. 6 displays a Node B according to the invention. As explained in relation to FIG. 5, Node B receives responses from UE providing information on the outcome of data transfers over the radio interface from Node B to UE. By means of this information Node B establishes an image of the UE status. In FIG. 6, the information provided is input to and the status image is established in means 6 of Node B. Preferably means 6 is localized to the entity of the hybrid ARQ protocol, as this protocol processes the UE responses to decide whether data packets should be retransmitted or not.

Further, the hybrid ARQ protocol passes information from RLC destined for UE, requests for retransmissions destined for UE included. According to the invention there is provided means 7 for receiving request for one or more status reports of UE and means 8 for identifying RLC requests for status report destined for the RLC layer of UE. Upon identification of a request for status report, processing means 9 of the protocol entity determines whether there is an established status report available or if there is enough information available for establishment of a status report in means 6, properly reflecting the UE status. If so, the transfer of the RLC request for status report to RLC layer of UE is inhibited and means 10 of Node B transmits to RLC layer of RNC/UTRAN the status report based on data imaging UE status.

Node B also comprises means 11 for receiving status reports destined for RLC of RNC/UTRAN from UE. As explained above such a status report can be established without being initiated by a request from RLC of RNC/UTRAN, e.g., when the hybrid ARQ protocol fails and there is need for retransmission of a PDU from RLC. However, in some cases the corresponding PDU has not been deleted from the UTRAN-side hybrid ARQ protocol entity. Processing means 12 of Node B determines, depending on the various conditions, whether the status report from UE should be forwarded, as a whole or in part, to RLC layer of RNC/UTRAN or if all or some of requested PDUs are already available in the UTRAN-side hybrid ARQ protocol entity with no need to request the PDUs from RLC.

Figure 7:
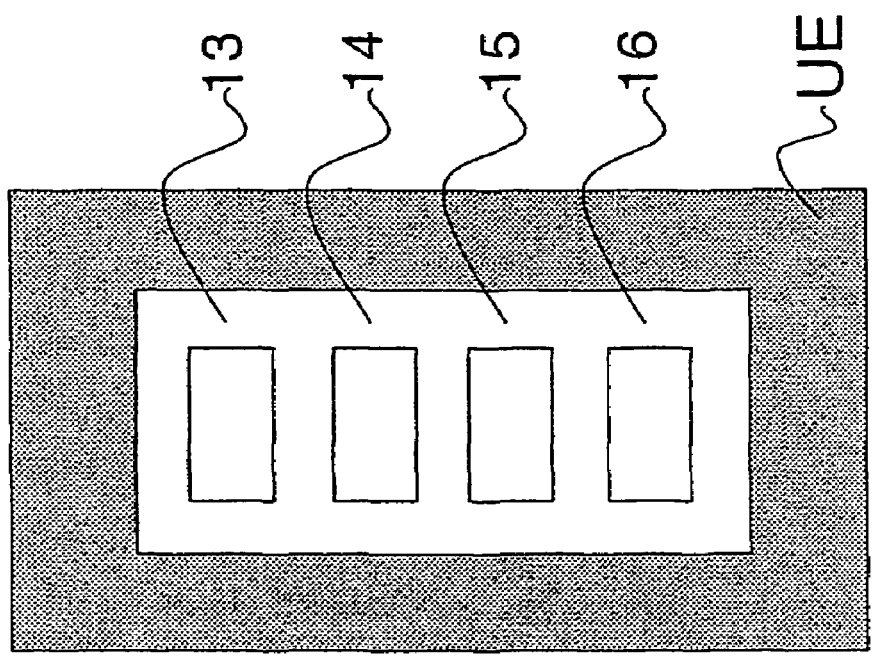
FIG. 7 displays a User Equipment according to the invention.

FIG. 7 displays a User Equipment, UE, according to the invention. The UE comprises protocol means being an entity of at least one of an L2 RLC layer 13, an L2 MAC layer 14 and/or an L2 MAC-HSDPA layer 15. As described in detail above, the L2 MAC-HSDPA can alternatively be considered an extension of an L2 MAC layer. Preferably the L2 MAC-HSDPA layer 15 includes a HARQ protocol. The user equipment also comprises an L1 layer 16. When L2 RLC layer in UE establishes status reports according to prior art, the status reports are destined for the L2 RLC correspondence in UTRAN. Also layer L2 MAC and the extension thereof, or layer L2 MAC-HSDPA, have their UTRAN correspondences. The UTRAN-entity or -entities of these layers residing in Node B are referred to as UTRAN-HARQ protocol entity/entities. Their one or more correspondences in UE are referred to as UE HARQ protocol entity/entities. According to the invention, PDUs of status reports established in L2 RLC layer 13 are passed to the UE HARQ protocol layer 14, 15.

A person skilled in the art readily understands that the receiver and transmitter properties of a BS or a UE are general in nature. The use of concepts such as BS, UE or RNC within this patent application is not intended to limit the invention only to devices associated with these acronyms. It concerns all devices operating correspondingly, or being obvious to adapt thereto by a person skilled in the art, in relation to the invention. As an explicit nonexclusive example the invention relates to mobile stations without a subscriber identity module, SIM, as well as user equipment including one or more SIMs. Further, protocols and layers are referred to in close relation with UMTS terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method of reducing or eliminating transmissions over a scarce communication link resource in a communications system, wherein
   a network element responsible for transmissions over the scarce communication link resource establishes an image of the scarce communication link resource receiving end status on the network element side of the scarce communication link resource, and
   upon reception of a request for a report on status of the receiving end of the scarce communication link resource destined for the receiving end of the scarce communication link resource, the network element identifies the request.

2. The method according to claim 1, wherein the request for a report on status of the receiving end of the scarce communication link resource is destined for a radio link control protocol layer.

3. The method according to claim 1, wherein upon reception of a request for a report on status of the receiving end of the scarce communication link resource destined for the receiving end, the network element responds to the request by transmitting a status report based on the image of the receiving end status of the scarce communication link resource receiving end status.

4. The method according to claim 1, wherein the status image is established, the received request for reports on status of the receiving end of the scarce communication link resource is processed, the status report is established, or the status report triggering is inhibited in an entity responsible for hybrid ARQ over the scarce communication link resource.

5. The method according to claim 1, wherein the status image is established, the received request for reports on status of the receiving end of the scarce communication link resource is processed, the status report is established, or the status report triggering is inhibited in an entity of a medium access control protocol layer or an extension thereof.

6. The method according to claim 1, wherein the status image is established, the received request for reports on status of the receiving end of the scarce communication link resource is processed, the status report is established, or the status report triggering is inhibited in an entity of a protocol layer in juxtaposition to the medium access control layer and being a higher protocol layer than the physical layer and a lower protocol layer than the medium access control layer in a protocol stack.

7. The method according to claim 1, wherein the status image is established, the received request for reports on status of the receiving end of the scarce communication link resource is processed, the status report is established, or the status report triggering is inhibited in an entity of a MAC-HSDPA protocol layer.

8. Radio communications system including means for carrying out the method in claim 1.

9. A method of reducing or eliminating transmissions over a scarce communication link resource in a communications system, wherein
   a network element responsible for reception of transmissions over the scarce communication link resource establishes an image of the scarce communication link resource receiving end status on the network element side of the scarce communication link resource, and
   upon activation of a status report trigger of the network element, the network element transmits a report on status of the receiving end of the scarce communication link resource to a network control element.

10. The method according to claim 9, wherein the status report trigger is at least one of a:
   Polling request for a status report,
   Missing PU or PUs detected,
   Timer Initiated Status Report,
   Estimated PDU counter, and
   Number of PDUs transmitted to UE.

11. The method according to claim 9, wherein a corresponding status report triggering in the receiving end of the scarce communication resource is inhibited or postponed.

12. The method according to claim 11, wherein a timer or a PDU counter is set in the receiving end of the scarce communication resource to a greater time interval or greater number of PDUs, respectively, than a corresponding timer or counter in the network element.

13. The method according to claim 9, wherein the network control element is an entity of a radio link control protocol layer.

14. The method according to claim 9, wherein the network control element is a radio network controller.

15. A method of reducing or eliminating transmissions over a scarce communication link resource in a communications system, wherein
   a network element for receiving signals in the form transmitted over the scarce communication link resource receives messages or status reports as transmitted over the scarce communication link resource, and
   determines whether the received message or status report, or parts thereof, should be processed in the network element, or if it should be forwarded.

16. The method according to claim 15, wherein information is provided from a protocol layer responsible for hybrid ARQ over the scarce communication link resource for determining whether the received message or status report, or parts thereof, should be processed in the network element, or if it should be forwarded.

17. The method according to claim 15, wherein information is provided from a protocol layer being a medium access control protocol layer or an extension of a medium access control protocol layer for determining whether the received message or status report, or parts thereof should be processed in the network element, or if it should be forwarded.

18. The method according to claim 15, wherein information is provided from a protocol layer in juxtaposition to the medium access control protocol layer and being a higher protocol layer than the physical layer and a lower protocol layer than the medium access control layer in a protocol stack for determining whether the received message or status report, or parts thereof, should be processed in the network element, or if it should be forwarded.

19. The method according to claim 15, wherein information is provided from a MAC-HSDPA protocol layer for determining whether the received message or status report, or parts thereof, should be processed in the network element, or if it should be forwarded.

20. A network element for transmitting signals over a scarce communication link resource in a communications system, comprising:
    means for reducing or eliminating transmissions of messages or status reports over a scarce communication link resource in a communications system,
    means for establishing an image of the scarce communication link resource receiving end status, and
    means for identifying a request for a report on status of the receiving end of the scarce communication link resource destined for the receiving end of the scarce communication link resource.

21. The network element according to claim 20, further comprising:
    means for receiving a request for a report on status of the receiving end of the scarce communication link resource, destined for the receiving end of the scarce communication link resource and means for transmitting a status report based on an image of the scarce communication link resource receiving end status, upon reception of a request for a report on status of the receiving end of the scarce communication link resource.

22. The network element according to claim 21, wherein the network element is configured to transmit a report on status of the receiving end of the scarce communication link resource to an entity of a radio link control protocol layer.

23. The network element according to claim 20, wherein the network element is a protocol entity.

24. The network element according to claim 20, wherein the network element is a Node B entity.

25. The network element according to claim 20, wherein the means for reducing or eliminating transmissions over a scarce communication link resource in a communications system includes means for hybrid ARQ over the scarce communication link resource.

26. The network element according to claim 20, wherein the means for reducing or eliminating transmissions over a scarce communication link resource in a communications system includes a medium access control protocol layer or an extension thereof.

27. A radio communications system including a plurality of network elements according to claim 20.

28. A network element for transmitting signals over a scarce communication link resource in a communications system, comprising:
    means for reducing or eliminating transmissions of messages or status reports over a scarce communication link resource in a communications system,
    means for establishing an image of the scarce communication link resource receiving end status, and
    means for transmitting a report on status of the receiving end of the scarce communication link resource.

29. The network element according to claim 28, wherein the status report trigger is at least one of a:
    Polling request for a status report,
    Missing PU or PUs detected,
    Timer Initiated Status Report,
    Estimated PDU counter, and
    Number of PDUs transmitted to UE.

30. A network element for receiving signals in the form transmitted over a scarce communication link resource, comprising:
    means for reducing or eliminating transmissions over a scarce communication link resource in a communications system,
    means for receiving one or more messages or status reports in the form transmitted over the scarce communication link resource, and
    means for determining whether the received message or status report, or parts thereof, should be processed in the network element or if it should be forwarded.

31. A user equipment being responsible for transmitting signals over a scarce communication link resource in a communications system to one or more network elements, comprising:
    electronic circuitry for providing at least one of the network elements with information enabling the at least one of the network elements to establish an image of the user equipment receive status,
    wherein the provision of the information is initiated in an entity including a protocol layer responsible for hybrid ARQ over the scarce communication link resource.

32. The user equipment according to claim 31, wherein the electronic circuitry is configured to use a medium access control protocol layer or an extension thereof.

33. The user equipment according to claim 31, wherein the electronic circuitry is configured to use a MAC-HSDPA protocol layer.

* * * * *